Patented Aug. 29, 1939

2,171,420

UNITED STATES PATENT OFFICE 2,171,420

CARBAMYL DITHIO-CARBAMATES

Ira Williams, Woodstown, N. J., assignor to E. I. du Pont de Nemours & Company, Wilmington, Del., a corporation of Delaware No Drawing. Application August 12, 1937, Serial No. 158,733

14 Claims. (Cl. 260—455)

This invention relates to a class of new compounds which accelerate the vulcanization of rubber and to the vulcanization of rubber with such compounds.

Some of the derivatives of disubstituted dithio carbamic acid such as the ammonium or zinc salts, the thiuram disulfides and the thioanhydrides are known, particularly as accelerators of vulcanization of rubber. United States Patent 1,440,964 discloses carbamyl dithio carbamates broadly as accelerators for rubber. French Patent 803,022 and United States Patent 2,065,587 disclose the use of diaryl carbamyl dialkyl dithio carbamates as accelerators for rubber. While such compounds are accelerators of the vulcanization of rubber, they are not suited to all conditions of vulcanization. For example, the zinc and ammonium salts are too active at low temperatures for many purposes. The thio anhydrides are limited in many cases by the rapid reversion of the rubber compound when such compound is slightly over-vulcanized.

It is an object of the present invention to provide a class of new chemical compounds which are useful as accelerators of vulcanization. Another object is to provide a class of accelerators which permit a wide range of over cure without reversion. A further object is to provide a class of accelerators which reach their maximum activity through a narrow temperature range, being much less active at temperatures below and above such temperature range. A still further object is to provide an improved method of vulcanizing rubber. Other objects are to provide new compositions of matter and to advance the art. Still other objects will appear hereinafter.

The above objects may be accomplished in accordance with my invention which comprises producing a class of new chemical compounds which are accelerators for the vulcanization of rubber, which may be designated as aryl alkyl carbamyl dialkyl dithio carbamates, and which may be represented by the formula:

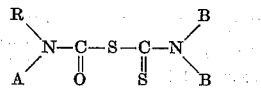

wherein "R" represents an aromatic radical free of substituents other than hydrocarbon, hydroxy, alkoxy and halogen groups, "A" represents an aliphatic radical free of substituents other than aryl and hydroxy groups, and "B" represents a carbon atom of an aliphatic hydrocarbon radical. Each carbon atom represented by "B" may be in a separate and distinct aliphatic radical, or may be a different carbon atom in a single aliphatic hydrocarbon radical such as pentamethylene.

It has long been known that the dithio carbamates in general are more or less unstable toward heat. The heretofore known carbamic acid derivatives and mono substituted carbamic acid derivatives are so unstable that decomposition usually occurs below vulcanizing temperatures, and hence such derivatives are of little value as accelerators for the vulcanization of rubber. Previous attempts to control the stability of such compounds by altering the substituents in disubstituted carbamic acid derivatives have been only partly successful. I have now found that the decomposition can be controlled by regulation of the substituents on the carbamyl group of the carbamyl dithio carbamates. The provision of both an aryl and an alkyl substituent results in a compound which is stable until vulcanization temperature is reached, but is essentially inactive below 221° F. These compounds reach maximum activity at about 257° F. to about 275° F. and rapidly decrease in activity above this temperature. These compounds are particularly suited to the vulcanization of bulky objects which must be heated to high temperatures for long periods of time in order to vulcanize the interior. Under these conditions, the exterior of the objects is heated to high temperatures over extended periods of time which, in the case of the prior accelerators, results in serious over-vulcanization. However, when my compounds are employed under the same conditions, the exterior of the object will become well vulcanized as the temperature increases, but does not become over cured at the higher temperatures.

The compounds of my invention may be prepared by treating a salt, preferably an alkali metal salt, such as the sodium salt of the dithio carbamic acid in an inert volatile solvent with about one molecular proportion of the appropriate carbamyl halide preferably at about room temperature. Higher temperatures may be employed which, in some cases, will render the product more soluble in the solvent and hence permit the use of smaller amounts of the solvent. Such higher temperatures must be below the decomposition temperature of the product, usually below about 260° F. Preferably, the temperature should be maintained below the boiling point of the solvent. In many cases, the reaction may be carried out in water, but it is generally preferred to employ an inert solvent such as benzene, acetone and the like. The preferred solvents are those having boiling points below the decomposition temperature of the product or below about 260° F. Acetone has been found to be particularly satisfactory due to the fact that the reacting ingredients are soluble in it, while the salt which is formed is insoluble in this solvent. The resulting carbamyl dithio carbamate may be obtained from the solvent by crystallization or other suitable means.

Some of the compounds which have been prepared by the method just described and which are useful as rubber accelerators are given below with their characteristics, "M. P." meaning melting point:

Phenyl-methyl carbamyl dimethyl dithio carbamate. Yellow prisms. M. P. 135–137° C.

Phenyl-methyl carbamyl pentamethylene dithio carbamate Yellow crystals. M. P. 99–101° C.

Phenyl-ethyl carbamyl dimethyl dithio carbamate. Yellow needles. M. P. 89.5–90.5° C., stable form yellow prisms. M. P. 98–99° C.

Phenyl-ethyl carbamyl pentamethylene dithio carbamate. Yellow needles. M. P. 99–100° C.

Ethyl-o-tolyl carbamyl dimethyl dithio carbamate. Yellow prisms. M. P. 84–87° C.

Ethyl-o-tolyl carbamyl pentamethylene dithio carbamate. Yellow crystals. M. P. 93–95° C.

b-Hydroxy ethyl-phenyl carbamyl dimethyl dithio carbamate. White plates. M. P. 142–143° C.

p-Methyl benzyl-phenyl carbamyl dimethyl dithio carbamate. Yellow prisms. M. P. 118–119° C.

Ethyl-a-naphthyl carbamyl dimethyl dithio carbamate. Yellow prisms. M. P. 107–109° C.

Ethyl-a-naphthyl carbamyl pentamethylene dithio carbamate. Cream colored crystals. M. P. 138.5–140° C.

Methyl-4 hydroxy phenyl carbamyl dimethyl dithio carbamate. Cream colored crystals. M. P. 136–138° C.

Methyl phenyl carbamyl dicyclo hexyl dithio carbamate. Yellow crystals. M. P. 102–104° C.

The following two examples illustrate the preferred method of preparing the compounds of my invention.

*Example 1*

188 g. (1 mol) of anhydrous sodium dimethyl dithio-carbamate were ground and added to 2 liters of acetone with stirring. Considerable of the dithio-carbamate went into solution. 184 g. (1 mol) of phenyl ethyl carbamyl chloride were then added and the solution allowed to stand for 12 hours with occasional stirring. The sodium chloride which had precipitated was filtered off and recovered in theoretical amount. The acetone was evaporated on a steam bath, leaving a yellow syrup which solidified on cooling to a mass of yellow crystals. These were filtered off, washed with petroleum ether, and dried. The material was purified by crystallization from alcohol. The yield was 61% of material melting at 90–90.5° C.

*Example 2*

199 g. (1 mol) of potassium pentamethylene dithio-carbamate were added to 1 liter of acetone, in which it is fairly soluble. 184 g. (1 mol) of phenyl ethyl carbamyl chloride was then added and the solution stirred for 4 hours, then allowed to stand for 4 hours. The KCl was filtered off in theoretical amount and the acetone evaporated on a steam bath. Upon cooling, a yellow crystalline mass was formed. The crystals were filtered off, washed with gasoline and air dried. Further purification was carried out by crystallization from alcohol. A 68% yield of pale yellow crystals melting at 98–100° C. was obtained.

In order to more clearly illustrate my invention as it relates to the vulcanization of rubber, the preferred modes of carrying the same into effect and the advantageous results to be obtained thereby, the following examples are given:

*Example 3*

A compound containing 5 parts of zinc oxide, 1 part of stearic acid, 3 parts of sulfur and 0.5 part of phenyl ethyl carbamyl dimethyl dithio-carbamate in 100 parts of rubber was vulcanized at increasing temperature with the following results:

| Temperature, °F. | Maximum load at 600% elongation in lbs./in.$^2$ | Minutes required to reach maximum |
|---|---|---|
| 227 | Not cured in 120 minutes | |
| 239 | 1650 | 60 |
| 250 | 1575 | 45 |
| 259 | 1400 | 30 |

*Example 4*

A compound containing 5 parts of zinc oxide, 25 parts of carbon black, 1 part of stearic acid, 3 parts of sulfur, 0.5 part of diphenyl guanidine and 0.5 part of phenyl ethyl carbamyl dimethyl dithio-carbamate in 100 parts of rubber was vulcanized at increasing temperatures with the following results:

| Temperature, °F. | Maximum load at 500% elongation in lbs./in.$^2$ | Minutes to reach required maximum |
|---|---|---|
| 227 | 3475 | 120 |
| 239 | 3300 | 90 |
| 250 | 3075 | 60 |
| 259 | 2950 | 50 |
| 274 | 2600 | 30 |

*Example 5*

In order to show the wide curing range, even when vulcanization takes place at a relatively high temperature, the following compounds were vulcanized at 274° F. and tested:

| Compound | 1 | 2 | 3 |
|---|---|---|---|
| Smoked sheets | 100 | 100 | 100 |
| Zinc oxide | 5 | 5 | 5 |
| Carbon black | 43 | 43 | 43 |
| Stearic acid | 2 | 2 | 2 |
| Pine tar | 1 | 1 | 1 |
| Sulfur | 3 | 3 | 3 |
| Diphenyl guanidine | .5 | .5 | |
| Phenyl ethyl carbamyl dimethyl dithio-carbamate | .5 | | |
| a-Naphthyl ethyl carbamyl dimethyl dithio-carbamate | | .5 | |
| a-Naphthyl ethyl carbamyl pentamethylene dithio-carbamate | | | 1 |

| Min. cure at 274° F. | Lbs./in.$^2$ load at 500% elongation, compound— | | |
|---|---|---|---|
| | 1 | 2 | 3 |
| 30 | 3550 | 3500 | 3525 |
| 60 | 3400 | 3150 | 3425 |
| 90 | 3325 | 3200 | 3075 |
| 120 | 3200 | 3200 | 2950 |
| 180 | 3200 | 3150 | 2950 |

It will be noted from Example 3 that this class of compounds may be employed by themselves as accelerators for the vulcanization of rubber with good results. However, they are much more active when employed in conjunction with a basic activating agent of the types which are well known to the art. Representative examples of such activating agents are the diaryl guanidines such as diphenyl guanidine and di-o-tolyl guanidine, aldehyde-amine condensation products, ammonium salts and amines. Such activating agents increase the activity of the compounds at the lower temperatures, thereby causing vulcanization to take place at lower temperatures, but do not prevent the compounds from decreasing in activity at the high temperatures where over-vulcanization tends to take place with other accelerators.

While I have disclosed a number of compounds within the class and the use of some of these for accelerating the vulcanization of rubber, many other equivalent compounds which will also be useful for the same purposes will be apparent to those skilled in the art. For example in the formula

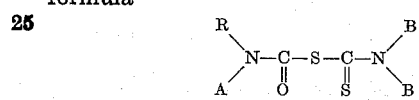

"R" may be a phenyl or a naphthyl group which may be unsubstituted or substituted with such groups as methyl, ethyl, propyl, isopropyl, butyl, isobutyl, tertiary butyl, phenyl, naphthyl, benzyl, hydroxyl, methoxy, ethoxy, butoxy, phenoxy, propoxy, chlorine, bromine, fluorine and the like. Also "A" and "B" may be represented by methyl, ethyl, propyl, isopropyl, butyl, isobutyl, tertiary butyl, benzyl, phenylethyl, diphenyl, methyl, cyclohexyl and higher homologs which, in the case of A, may also contain hydroxyl groups.

While I have disclosed the preferred embodiments of my invention and the preferred modes of carrying the same into effect, it will be readily apparent to those skilled in the art that many variations and modifications may be made therein without departing from the spirit of my invention. Accordingly, the scope of my invention is to be limited solely by the appended claims construed as broadly as is permissible in view of the prior art.

I claim:
1. A compound having the formula

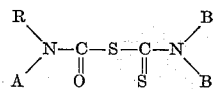

wherein R represents an aromatic radical free of substituents other than hydrocarbon, hydroxyl, alkoxy and halogen radicals, A represents a neutral aliphatic radical and B,B together represent a member of the group consisting of two separate and distinct aliphatic hydrocarbon radicals and a pentamethylene radical having two separate and distinct carbon atoms bonded to the nitrogen.

2. A compound having the formula

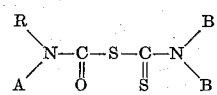

wherein R represents an aromatic hydrocarbon radical, A represents a neutral aliphatic radical and B,B together represent a member of the group consisting of two separate and distinct aliphatic hydrocarbon radicals and a pentamethylene radical having two separate and distinct carbon atoms bonded to the nitrogen.

3. A compound having the formula

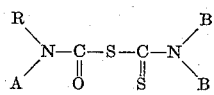

wherein R represents an aromatic hydrocarbon radical of the benzene series, A represents a neutral aliphatic radical and B,B together represent a member of the group consisting of two separate and distinct aliphatic hydrocarbon radicals and a pentamethylene radical having two separate and distinct carbon atoms bonded to the nitrogen.

4. A compound having the formula

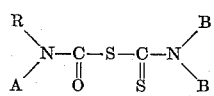

wherein R represents an aromatic radical free of substituents other than hydrocarbon, hydroxyl, alkoxy and halogen radicals, A represents an alkyl radical and B,B together represent a member of the group consisting of two separate and distinct aliphatic hydrocarbon radicals and a pentamethylene radical having two separate and distinct carbon atoms bonded to the nitrogen.

5. A compound having the formula

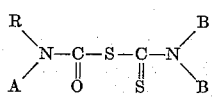

wherein R represents an aromatic hydrocarbon radical, A represents an alkyl radical and B,B together represent a member of the group consisting of two separate and distinct aliphatic hydrocarbon radicals and a pentamethylene radical having two separate and distinct carbon atoms bonded to the nitrogen.

6. A compound having the formula

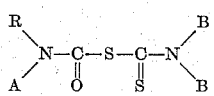

wherein R represents an aromatic hydrocarbon radical of the benzene series, A represents an alkyl radical and B,B together represent a member of the group consisting of two separate and distinct aliphatic hydrocarbon radicals and a pentamethylene radical having two separate and distinct carbon atoms bonded to the nitrogen.

7. Phenylethyl carbamyl dimethyl dithio-carbamate.

8. The method of preparing aryl alkyl carbamyl dialkyl dithio-carbamates which comprises adding about one molecular proportion of an aryl alkyl carbamyl halide to a salt of a dialkyl dithio-carbamic acid in an inert volatile solvent and separating the aryl alkyl carbamyl dialkyl dithio-carbamate from the solvent.

9. The method of preparing aryl alkyl carbamyl dialkyl dithio-carbamates which comprises adding about one molecular proportion of an aryl alkyl carbamyl halide to a salt of a dialkyl dithio-carbamic acid in an inert volatile solvent at a temperature from about room temperature to about the boiling point of the solvent and below the decomposition temperature of the aryl alkyl carbamyl dialkyl dithio-carbamate and separating the aryl alkyl carbamyl dialkyl dithio-carbamate from the solvent.

10. The method of preparing aryl alkyl carbamyl dialkyl dithio-carbamates which comprises adding about one molecular proportion of an aryl alkyl carbamyl halide to a salt of a dialkyl dithio-carbamic acid in an inert volatile solvent at about room temperature, maintaining the temperature until the reaction is complete and separating the aryl alkyl carbamyl dialkyl dithio-carbamate from the solvent.

11. The method of preparing aryl alkyl carbamyl dialkyl dithio-carbamates which comprises adding about one molecular proportion of an aryl alkyl carbamyl halide to an alkali metal salt of a dialkyl dithio-carbamic acid in an inert volatile solvent and separating the aryl alkyl carbamyl dialkyl dithio-carbamate from the solvent.

12. The method of preparing aryl alkyl carbamyl dialkyl dithio carbamates which comprises adding about one molecular proportion of an aryl alkyl carbamyl halide to an alkali metal salt of a dialkyl dithio carbamic acid in an inert volatile solvent at a temperature from about room temperature to about the boiling point of the solvent and below the decomposition temperature of the aryl alkyl carbamyl dialkyl dithio carbamate and separating the aryl alkyl carbamyl dialkyl dithio carbamate from the solvent.

13. Phenyl ethyl carbamyl pentamethylene dithio carbamate.

14. Ethyl a-naphthyl carbamyl dimethyl dithio carbamate.

IRA WILLIAMS.